United States Patent [19]

Faupell

[11] Patent Number: 4,506,832
[45] Date of Patent: Mar. 26, 1985

[54] ANTIROTATION LINKAGE FOR ROCKET MOTOR NOZZLES AND OTHER MECHANISMS

[75] Inventor: Lawrence C. Faupell, North Logan, Utah

[73] Assignee: Thiokol Corporation, Chicago, Ill.

[21] Appl. No.: 453,316

[22] Filed: Dec. 27, 1982

[51] Int. Cl.³ .............................................. B64C 15/00
[52] U.S. Cl. .................................. 239/265.35; 60/232; 239/587; 248/664; 285/184; 403/73; 403/119
[58] Field of Search ........................... 239/265.35, 587; 403/53, 54, 73, 119; 248/481, 664; 285/184; 60/228, 232

[56] References Cited

U.S. PATENT DOCUMENTS

| | | | |
|---|---|---|---|
| 1,185,435 | 5/1916 | Powell | 403/53 |
| 2,913,251 | 11/1959 | Herbenar | 403/119 |
| 3,048,011 | 8/1962 | Tumavicus | 60/232 |
| 3,142,153 | 7/1964 | Hensley | 60/232 |
| 3,361,362 | 1/1968 | Edwards | 239/265.35 |
| 3,436,021 | 4/1969 | Walton et al. | 239/265.35 |

Primary Examiner—John J. Love
Assistant Examiner—Michael J. Forman
Attorney, Agent, or Firm—Gerald K. White

[57] ABSTRACT

An antirotation linkage that allows freedom of angular deflection in two coordinate directions of a first member, for example, a rocket motor nozzle, with respect to the primary axis of a second member, a rocket motor in which the nozzle is mounted for angular displacement of the thrust vector for steering control, but which restricts rotation of the first member about such primary axis.

2 Claims, 1 Drawing Figure

U.S. Patent     Mar. 26, 1985     4,506,832
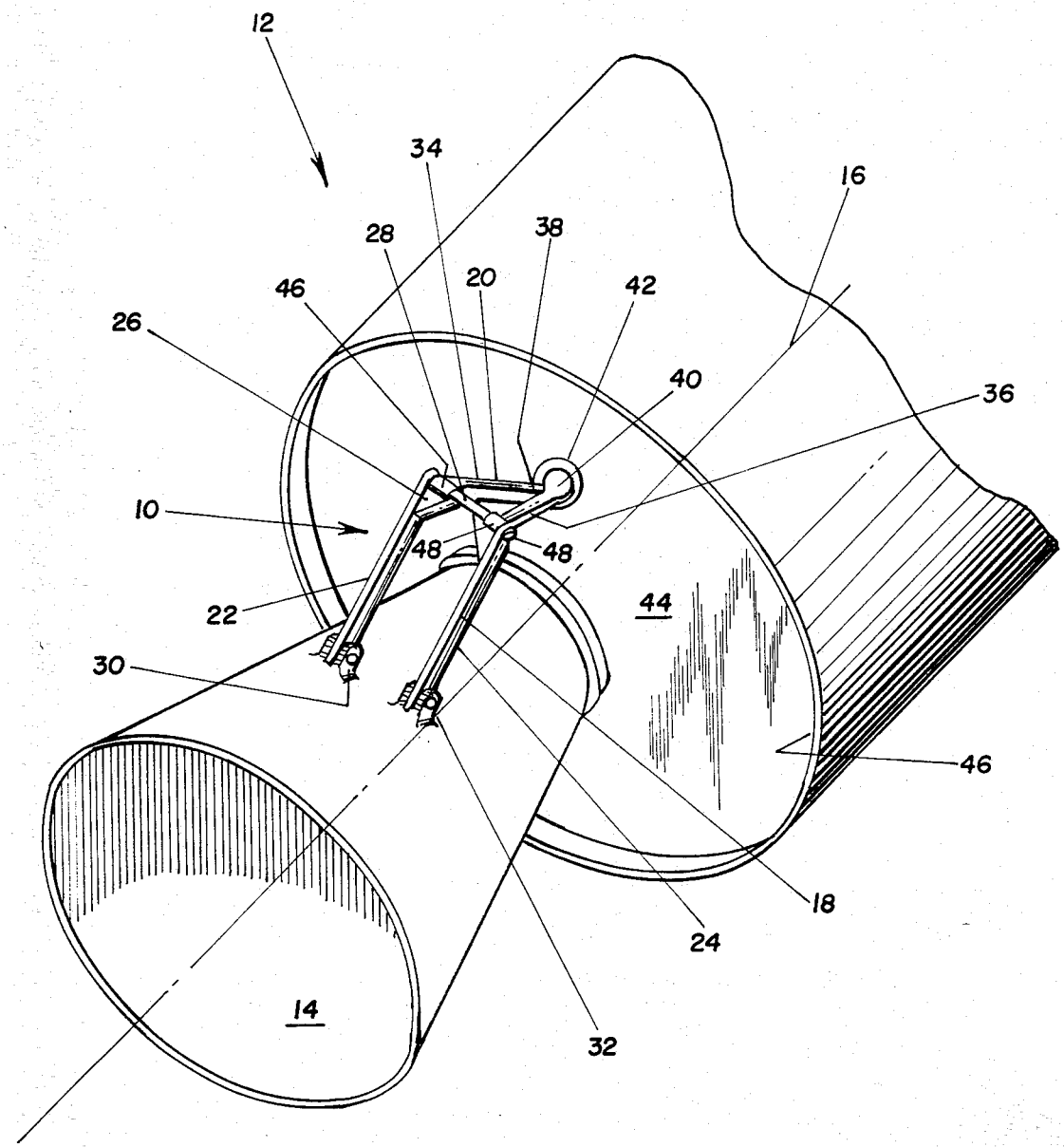

ANTIROTATION LINKAGE FOR ROCKET MOTOR NOZZLES AND OTHER MECHANISMS

BACKGROUND OF THE INVENTION

1. Field of the Invention

The present invention relates to an antirotation linkage that allows freedom of movement in two coordinate directions of a rocket motor nozzle with respect to the primary or longitudinal axis of a rocket motor in which it is rotatably mounted for angular displacement of the thrust vector for steering control, but which restricts rotation of the nozzle about such primary axis.

2. Description of the Prior Art

Thrust vector control systems for rocket propelled vehicles are known in the prior art in which the nozzle, including the nozzle throat and expansion cone, are rotatably mounted or pivoted, being carried by a spherical or other bearing, for omni axial rotation of the nozzle relative to the rocket vehicle so that the thrust vector can be angularly displaced to steer the vehicle.

Systems of this type including hydraulic cylinders that are positioned externally of the nozzle for deflecting or "slewing" the nozzle to change the direction of flight of the vehicle are disclosed in U.S. Pat. No. 3,049,877 granted to A. Sherman on Aug. 2, 1962 and U.S. Pat. No. 3,230,708 granted to D. H. Huang et al on Jan. 25, 1966. Thrust vector control systems in which the nozzle is carried by the ball or race of a spherical bearing, and which include a "self actuation" or an internal actuation system for deflecting the nozzle to steer the vehicle, are disclosed in U.S. Pat. No. 3,912,172 granted Oct. 14, 1975 to Thomas E. Bolner, and in the pending application for U.S. patent of Thomas E. Bolner bearing Ser. No. 260,941, filed May 6, 1981, now Pat. No. 4,435,023, issued Mar. 6, 1984, the disclosures of which Bolner patent and pending patent application, by reference, are incorporated herein.

A problem in rocket technology is a tendency of the nozzle to rotate about the primary or longitudinal axis of the rocket vehicle in which it is mounted for rotation. This places undesirable, torsional, shear stresses on the nozzle bearings, and reduces the ability to steer the rocket vehicle accurately.

SUMMARY OF THE INVENTION

An object of the invention is to provide an antirotation linkage for permitting angular deflection or slewing in two coordinate directions of a rocket nozzle with respect to the primary or longitudinal axis of a rocket motor in which it is rotatably mounted, while restricting rotation of the nozzle about such primary axis, thereby to avoid or at least minimize the undesirable, torsional, shear stresses on the nozzle bearings and reduction in ability to steer the rocket motor accurately encountered in the prior art.

A more general object of the invention is to provide a simple and effective antirotation linkage for permitting the angular deflection in two coordinate directions of a first member with respect to a primary axis of a second member to which said first member is rotatably mounted, while restricting rotation of the first member about such primary axis.

In accomplishing these and other objectives of the invention, there is provided a rocket propelled vehicle having a conventional, thrust vector control nozzle, as disclosed, for example, in the above-mentioned Bolner patent or patent application. A U-shaped first link comprising two legs and a cross bar is pivotally attached to the nozzle at the ends of the legs remote from the cross bar. A pin passes through the cross bar and also through holes in the ends of the legs of a V-shaped second link, pivotally attaching the links together. The tip or point of the second link is connected to a ball-and-socket joint that is, in turn, fixed to the dome of the aft closure of the rocket vehicle. This connection of the first and second links between the nozzle and the rocket vehicle permits omni axial deflection of the nozzle with respect to the primary or longitudinal axis of the rocket vehicle while restricting rotation of the nozzle about that axis.

BRIEF DESCRIPTION OF THE DRAWING

Having summarized the invention, a detailed description follows with reference being had to the accompanying single FIGURE of drawing which forms part of the specification and which comprises a fragmented perspective view of a rocket vehicle showing the antirotation linkage according to the present invention connected between the rocket vehicle and the nozzle thereof.

DESCRIPTION OF THE PREFERRED EMBODIMENT

As shown in the drawing, the antirotation linkage of the present invention, indicated generally by the reference numeral 10, is applied to a rocket motor 12 having a thrust vector control nozzle 14. Nozzle 14 may be of the conventional convergent-divergent type that is suitably mounted on bearings (not shown) in the aft end of rocket motor 12 for angular displacement thereof relatively to the primary or longitudinal axis 16 of the rocket motor 12 for controlling the direction of the thrust vector, and thus, for steering the vehicle being propelled by the rocket motor 12.

The antirotation link 10 includes a U-shaped first link 18 and a V-shaped second link 20. The U-shaped first link 18 includes two parallel legs 22 and 24 and a butt hinge-like cross bar 26, having an intermediate knuckle 28. The ends of the legs 22 and 24 remote from the cross bar 26 are attached in a pivotal manner by lugs 30 and 32, respectively, to nozzle 14.

The V-shaped second link 20 includes two diverging legs 34 and 36 that are joined at one end forming an apex or point 38. The point 38 of link 20 is fixed to the ball 40 of a ball-and-socket joint 42 that is attached to the dome 44 of the aft closure 46 of rocket motor 12. At the other end of each of the legs 34 and 36, there is provided a respectively associated hub or knuckle 46 and 48. The knuckles 46 and 48 are joined to the cross bar 26 by a linking pin 48 that passes through the knuckles 28, 46 and 48 and also through holes in the ends of legs 22 and 24, pivotally attaching the links 18 and 20 together.

With this arrangement, angular deflection or displacement of nozzle 14 relative to the primary or longitudinal axis 16 of the rocket motor 12 is permitted in two coordinate directions for effecting pitch and yaw steering adjustments. Rotation of the nozzle 14 about the rocket motor primary axis 16 is not permitted, however, such rotation being precluded by the antirotation linkage 10.

Thus, there has been provided, in accordance with the invention, an antirotation linkage for permitting the angular deflection or slewing in two coordinate directions of a rocket nozzle with respect to the primary axis of a rocket motor in which the nozzle is rotatably mounted, while restricting rotation of the nozzle about such primary axis. The antirotation nozzle is characterized by its simplicity and effectiveness in overcoming the tendency in rocket propelled vehicles, encountered in the prior art, of the nozzle to rotate about the primary axis of the motor, and hence, in avoiding the undesirable, torsional, shear stresses on the nozzle bearings and a concomitant reduction in ability to steer the vehicle accurately.

What is claimed is:

1. An antirotation linkage that permits angular deflection of a first member with respect to a primary axis of a second member on which said first member is mounted for rotation, while restricting rotation of the first member about such primary axis comprising, a U-shaped first link having two substantially parallel legs and a hollow cross bar with the end of each of said legs remote from said cross bar being pivotally attached to said first member, a ball-and-socket joint connected to said second member, said ball-and-socket joint having a ball, a pin, and a V-shaped second link having two legs with the point thereof fixed to the said ball of said ball-and-socket joint, with said legs each having a hole in the end remote from said ball and disposed in cooperative relation with said cross bar of said U-shaped first link, and with said pin passing through said cross bar and through said holes in the ends of said legs of said V-shaped link, whereby said U-shaped first link and said V-shaped second link are attached pivotally together.

2. An antirotation linkage as specified in claim 1 wherein said first member comprises a rocket motor nozzle and the second member comprises a rocket motor, said nozzle being mounted for rotation in the aft closure of said rocket motor, said aft closure having a dome, and wherein said ball-and-socket joint is fixed to said dome of said rocket motor after closure.

* * * * *